United States Patent [19]

Shields

[11] Patent Number: 4,807,262

[45] Date of Patent: Feb. 21, 1989

[54] APPARATUS FOR SEALING THE SEAM BETWEEN TWO CONDUITS

[75] Inventor: Edward P. Shields, North Huntingdon, Pa.

[73] Assignee: Westinghouse Electric Corp., Pittsburgh, Pa.

[21] Appl. No.: 188,720

[22] Filed: Apr. 29, 1988

Related U.S. Application Data

[63] Continuation of Ser. No. 925,861, Oct. 30, 1986, abandoned.

[51] Int. Cl.⁴ .............................................. G21C 13/00
[52] U.S. Cl. ..................................... 376/203; 285/302
[58] Field of Search ................ 376/203, 463; 285/302

[56] References Cited

U.S. PATENT DOCUMENTS

| | | | |
|---|---|---|---|
| 3,451,483 | 6/1969 | Van Houtte et al. | 285/302 |
| 3,576,335 | 4/1971 | Kowal et al. | 285/302 |
| 4,047,085 | 3/1987 | Anderson et al. | 285/302 |
| 4,707,002 | 11/1987 | Boissier et al. | 376/203 |
| 4,728,479 | 3/1988 | Merkovsky | 376/203 |

Primary Examiner—Deborah L. Kyle
Assistant Examiner—R. L. Klein
Attorney, Agent, or Firm—M. G. Panian

[57] ABSTRACT

Apparatus for sealing the seam between two conduits which includes two cooperatively threaded members for applying relative axial clamping forces to the conduits. When the two cooperatively threaded members are relatively rotated, they apply relative axial force to the conduits thereby causing a sealing means to be disposed in tight contact between the conduits.

21 Claims, 2 Drawing Sheets

APPARATUS FOR SEALING THE SEAM BETWEEN TWO CONDUITS

This application is a continuation of application Ser. No. 925,861 filed Oct. 30, 1986, abandoned.

BACKGROUND OF THE INVENTION

1. Field of the Invention.

This invention relates to an apparatus for forming a pressure seal at the seam of two conduits and, more particularly, to such a device which incorporates a single pair of threaded members which cooperatively provide a generally axial uniform sealing force around the entire perimeter of the port column and male flange of a nuclear reactor instrumentation port.

2. Background Information.

The port column and male flange of a nuclear reactor instrumentation port, are two generally tubular members which are sized to cooperate in a telescoping manner.

The port column defines, near one end, a conical sealing flange against which is disposed a conical gasket. When placed in contact, under force, with a cooperating conical sealing recess in f the male flange, the conical sealing flange and gasket seal the seam between the port column and male flange thereby resisting the passage of fluid through the seam.

Located within the port column and male flange are electrical conductors which are necessary in the operation of the nuclear reactor As pressurized radioactive fluid is contained within the nuclear reactor it is critical that the seam between the port column and male flange be properly sealed to prevent the escape of radioactive material from the reactor. The conical seals are designed to provide such sealing action when the port column and male flange are pushed or clamped so that they are axially extended relative to one another.

The current apparatus to provide such clamping action incorporates the use of six separate jackscrews, each of which must be separately torqued in stages to provide the necessary axial clamping force around the entire perimeter of the port column and male flange. The jackscrews are disposed circumferentially around the perimeter of the port column and male flange through an annular ring called a jackscrew plate.

The base of each jackscrew is in contact with an annular shoulder which is formed in the male flange and the jackscrew plate is in contact with a protruding portion of a split ring which is disposed within an annular recess formed in the port column. The threads of each jackscrew cooperate with threads formed in circumferentially spaced holes formed in the jackscrew plate.

To axially extend the port column from the male flange, thereby creating the necessary clamping force and resultant seal, the jackscrews are rotated thereby moving the jackscrew plate in a direction away from the male flange and base of the jackscrews. The base of the jackscrews, thus, apply a force to the male flange while the jackscrew plate applies an equal and oppositely directed force to the split ring which, in turn, is transmitted to the port column.

Problems exist with this arrangement. Each jackscrew may be turned, individually, only a few turns before resistance in turning is encountered due to the remaining stationary jackscrews holding the jackscrew plate in place. Therefore, the remaining five jackscrews must each, individually, be turned a small number of turns to move the jackscrew plate evenly. The process must be repeated several times until the jackscrews and the jackscrew plate apply the necessary force between the port column and male flange. That creates problems.

First, the requirement that each jackscrew be rotated individually only a few turns at a time is both tedious and time consuming as each jackscrew must be turned individually six or more separate times, each time alternating with the other five jackscrews. Such a time consuming sealing process is undesirable in the environment in which the device is used. Second, if a person is careless in rotating the jackscrews, the jackscrews can be bent. That necessitates replacement of the jackscrews and, if the threads of the jackscrew plate have also been damaged, then the entire jackscrew plate may require replacement. Third, if the jackscrews are not finally torqued generally evenly, an unequal sealing force will occur around the port column and male flange perimeter which may possibly compromise the effectiveness of the seal.

There remains, therefore, a real need for an apparatus which is capable of axially extending on clamping the port column from the male flange, of a nuclear reactor instrumentation port, which eliminates the problems of the currently used apparatus.

SUMMARY OF THE INVENTION

In accordance with the invention, an apparatus is provided for axially clamping the port column from the male flange which incorporates only one pair of cooperatively threaded members which provide an even clamping force around the entire perimeter of the port column and male flange.

The present invention incorporates two generally hollow cylindrical members which have cooperating threads. One member, termed the first spacer means, incorporates internal threads which extend along about one-half of the first spacer means' longitudinal axis.

The second member, termed the second spacer means, incorporates an externally threaded surface which extends generally the entire length of the second spacer means' longitudinal axis with the exception of its two end portions. In this form, the second spacer means may be considered somewhat of a hollow screw The second spacer means has formed, at one end of its longitudinal axis, an inwardly projecting annular flange which is designed to apply force to the annular shoulder formed on the exterior of the male flange.

The first spacer means has an annular inwardly directed flange which, preferably, bears against an annular friction reducing means The friction reducing means reduces the amount of friction on the first spacer means when it is rotated The friction reducing means, in turn, bears against an annular plate means.

It is also contemplated that the friction reducing means may be eliminated, in which case the flange of the first spacer means would bear directly on the annular plate means. The annular plate means, in turn, bears against the split ring which is disposed within the recess in the port column. With that arrangement, the first spacer means is capable of transmitting the necessary force to the port column to axially clamp the port column from the male flange.

When the port column and male flange, are clamped axially apart, the conical sealing flange of the port column presses against the conical gasket, which, in turn, presses against the conical recessed surface of the male flange. Therefore, the conical gasket is compressed between the male flange and the port column thereby forming a seal at the seam of those two members.

The relative axial spacing which causes the seal to be effective between the male flange and port column is achieved by relative rotation between the first spacer means and the second spacer means When those two members are relatively rotated, the cooperating threads cause the first and second spacer means to move axially apart. That causes the second spacer means to press against the shoulder of the male flange while the first spacer means presses against the friction reducing means which, in turn, presses against the annular plate means thereby applying a force to the split ring which, in turn, presses on the port column. That results in a generally uniform force being applied around the entire periphery of the seal.

DESCRIPTION OF THE PREFERRED EMBODIMENT

Figure 1:
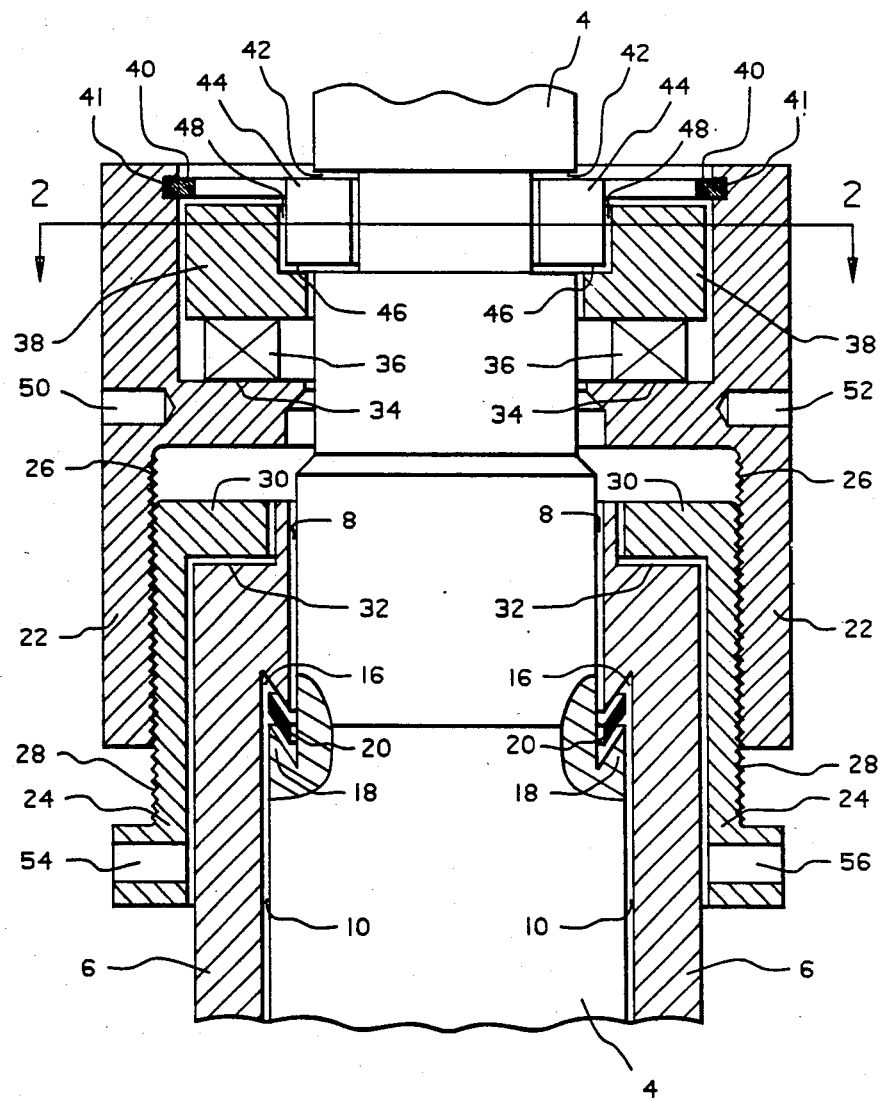
FIG. 1 is a longitudinal sectional view of the present invention as positioned on the male flange and port column of an instrumentation port.
Figure 2:
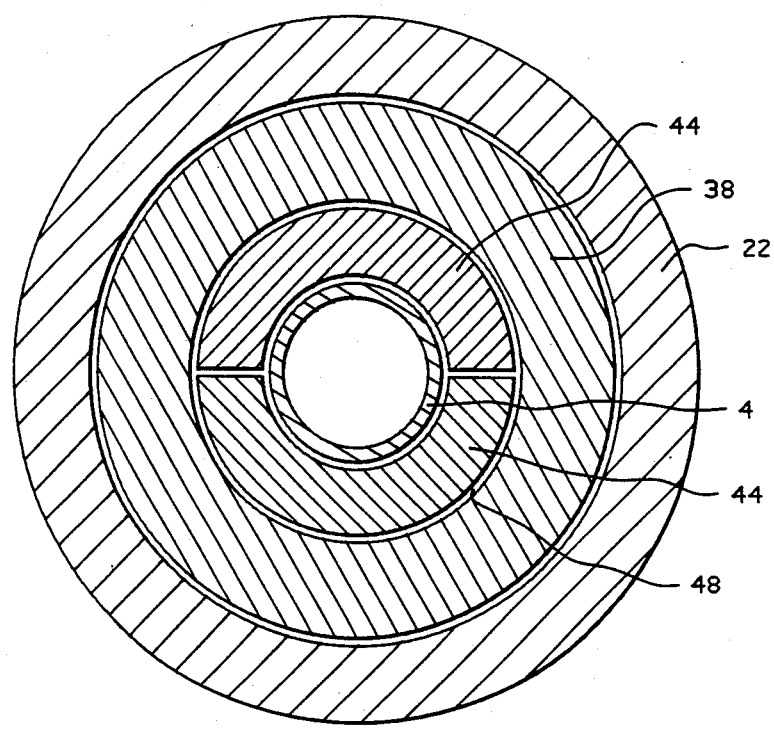
FIG. 2 is a cross section through the present invention and the port column taken along line 2—2 in FIG. 1.

FIGS. 1 and 2 show the present invention as disposed around first conduit or port column 4 and second conduit or male flange 6 of an instrumentation port of a nuclear reactor head. Port column 4 is partially disposed within male flange 6. The relative diameters of port column 4 and male flange 6 are such that spaces 8 and 10 are large enough to allow relative longitudinal movement between port column 4 and male flange 6 but small enough to provide a relatively close fit between those two members.

Male flange 6 has an annular conical shaped recess 16 formed within its interior surface while port column 4 has a similarly shaped annular flange 18 which cooperates with recess 16. Disposed between recess 16 and flange 18 is an annular conical gasket 20 which seals the seam formed by recess 16 and flange 18. As shown in FIG. 1, port column 4 and male flange 6 are axially spaced such that seal 20 is loosely disposed between recess 16 and flange 18.

When it is desired to provide a tight sealing action at that seam, it is necessary that port column 4 be axially extended relative to male flange 6 thereby causing seal 20 to be compressed in tight contact against the surfaces of recess 16 and flange 18. That is accomplished through the use of the present invention.

The apparatus of the present invention includes first spacer means 22 and second spacer means 24. First spacer means 22 is shaped in the form of a generally hollow, elongated cylinder and has formed in a portion of its interior surface threads 26. First spacer means 22 also includes annular flange 34 which projects radially inwardly, and holes 50 and 52 into one of which is inserted a spanner torque wrench for rotation of first spacer means 22. Also included in first spacer means 22 is annular groove 41 which receives snap ring 40.

Second spacer means 24 is also a generally hollow cylinder which has threads 28 formed in the exterior surface. Threads 28 cooperate with threads 26 to adjust the relative axial spacing between first spacer means 22 and second spacer means 24 when those two members are relatively rotated. Second spacer means 24 includes, at one end of its longitudinal axis, an annular flange 30 which bears against shoulder 32 of male flange 6 to detachably connect said second spacer means 24 to the male flange 6 so that it can rotate and apply an axial force to compress the seal 20 at said seam as shown in FIG. 1. Second spacer means 24 also has holes 54 and 56 into one of which is inserted a suitable tool for rotating second spacer means 24 with respect to first spacer means 22.

Disposed in contact with flange 34 is friction reducing means 36 which, in the preferred embodiment, takes on the form of a roller bearing race. Friction reducing means 36 reduces the amount of friction on flange 34 when first spacer means 22 is rotated. Disposed adjacent first spacer means 22, and in contact with friction reducing means 36, is annular plate means 38. Friction reducing means 36 and annular plate means 38 are held in position by a generally annular snap ring 40 which is disposed within annular groove 41.

Port column 4 has annular notch 42 formed around its perimeter. Disposed within notch 42 is split ring 44 which has an outer diameter larger than the outer diameter of port column 4. Projecting portion 46 of split ring 44 is received within annular recess 48 of annular plate means 38.

To seal the seam between port column 4 and male flange 6, first spacer means 22 is threaded onto second spacer means 24, friction reducing means 36 is disposed on flange 34 and annular plate means 38 is disposed on friction reducing means 36. Snap ring 40 is then inserted. That assembly is then placed around port column 4 and male flange 6, with flange 30 of spacer means 24 resting on shoulder 32 of male flange 6 as shown in FIG. 1. Split ring 44 is then disposed within notch 42 of port column 4 and first spacer means 22 is rotated relative to second spacer means 24 until annular plate means 38 is in contact with projecting portion 46 of split ring 44 to detachably connect said first spacer means 22 to the port column 4 in such a manner that it can rotate and apply an axial force to compress the seal 20 at said seam as shown in FIG. 1. This initial positioning may be done without any special tools by holding with one hand first spacer means 22 and, with the other hand, second spacer means 24 and relatively twisting them.

A suitable tool is then inserted into either hole 54 or 56 of second spacer means 24, and a spanner torque wrench is inserted into either hole 50 or 52 of first spacer means 22. By holding stationary the suitable tool and rotating first spacer means 22, through the use of the spanner torque wrench, first spacer means 22 will be axially extended relative to second spacer means 24. As that occurs, flange 30 will bear against shoulder 32 and flange 34 will bear against friction reducing means 36. The force applied by flange 34 will be transmitted through friction reducing means 36 and annular plate means 38 to split ring 44 through projecting portion 46.

As the force between projecting portion 46 and annular plate 38 increases, the increasing force of friction will cause relative rotational movement between annular plate 38 and split rings 44 to be resisted. However, as friction reducing means 36 is disposed between first spacer means 22 and annular plate 38, relative rotation of first spacer means 22 with respect to annular plate 38, split ring 44 and port column 4 is facilitated.

As the relative rotation between first spacer means 22 and second spacer means 24 continues, port column 4 will be axially clamped from male flange 6 causing seal 20 to be compressed between recess 16 and flange 18 as recess 16 and flange 18 are being wedged or clamped together. When a torque of approximately 150 to 160 lb.-ft. is reached, the seam between port column 4 and male flange 6 will be sufficiently sealed to resist the escape of fluid from port column 4 and male flange 6.

Alternatively, the friction reducing means 36 may be eliminated, in which case the flange 34 of the first spacer means 22 would bear directly on the annular plate across 38. The annular plate means 38, in turn, bears against the split ring 44 which is disposed within the notch 42 in the port column 4. With that arrangement, the first spacer means 22 is capable of transmitting the necessary force directly to the port column 4 to axially clamp the port column 4 from the male flange 6.

Figure 3:
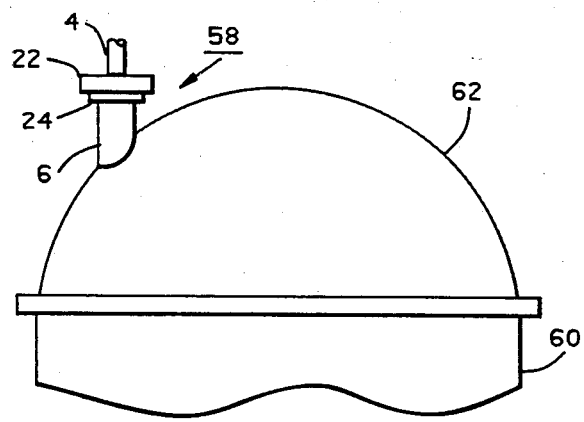
FIG. 3 is a schematic illustration of an instrumentation port incorporating the invention as installed in a nuclear reactor pressure vessel.

FIG. 3 illustrates an instrumentation port 58 installed in a nuclear reactor pressure vessel 60 with the male flange 6 secured to the vessel head 62 and the port column 4 extending upward out of the male flange. The first cylindrical spacer means 22 when rotated relative to second cylindrical spacer means 24 forces the port column upward to effect the seal which prevents the escape of pressurized fluid from the vessel at the instrumentation port. The instrumentation port is shown in FIG. 3 as enlarged relative to the vessel head for the sake of clarity.

Whereas particular embodiments of the invention have been described for purposes of illustration, it will be evident to those skilled in the art that numerous variations of the details may be made without departing from the invention as defined in the appended claims.

What is claimed is:

1. An apparatus for sealing the seam between first and second axially aligned conduits comprising:
   sealing means disposed at the seam between the first and second conduits to resist passage of fluid through the seam when the first conduit is relatively axially displaced with respect to the second conduit;
   first spacer means having means for detachably connecting said first spacer means to said first conduit in such a manner as to apply a generally uniform axial force to the perimeter of the first conduit and a first threaded surface, the first spacer means being disposed in surrounding relationship with the first conduit;
   second spacer means having means for detachably connecting said second spacer means to said second conduit in such a manner as to apply a generally uniform axial force to the perimeter of the second conduit and a second threaded surface which cooperates with said first threaded surface, the second spacer means being disposed in surrounding relationship with the second conduit;
   at least one of said spacer means being rotatably disposed with respect to the connected conduit; and
   said first threaded surface and said second threaded surface cooperating to relatively axially displace the first conduit and the second conduit by applying said axial forces thereto to compress said sealing means when said first spacer means and said second spacer means are relatively rotated.

2. The apparatus of claim 1 including friction reducing means interposed between said first spacer means and the first conduit for reducing the amount of friction on said first spacer means when said first spacer means is rotated relative to the first conduit.

3. The apparatus of claim 2 including a generally annular plate means interposed between said friction reducing means and the first conduit for applying said force from said first spacer means to the first conduit.

4. The apparatus of claim 3, wherein the means for detachably connecting said first spacer means to the first conduit comprises a generally annular inwardly projecting radial flange upon which said friction reducing means is disposed.

5. The apparatus of claim 4 including said first annular inwardly projecting radial flange disposed to position said friction reducing means and said annular plate means within said first spacer means.

6. The apparatus of claim 5 including retaining means disposed in said first spacer means and in contact with said annular plate means for holding said annular plate means and said friction reducing means in position.

7. The apparatus of claim 6
   wherein said first spacer means defines a generally annular groove, and
   wherein said retaining means is snap fitting means disposed within said groove.

8. The apparatus of claim 4, wherein the means for detachably connecting said second spacer means to the second conduit comprises a second generally annular flange in contact with the second conduit for applying said force from said second spacer means to the second conduit.

9. In combination:
   a nuclear reactor pressure vessel;
   an instrumentation port extending through said pressure vessel and comprising: a male flange secured to said pressure vessel, an instrumentation port column extending through said male flange, and generally annular sealing means between said male flange and instrumentation port column which forms a seal therebetween when said port column is axially displaced relative to said male flange; and
   means for axially displacing the port column relative to the male flange comprising: generally hollow cylindrical first spacer means having a first threaded surface and disposed in surrounding relationship with the port column, said first spacer means having a first generally annular inwardly projecting radial flange for applying a generally uniform axial force to the permitter of the port column; and generally hollow cylindrical second spacer means having a second threaded surface which cooperates with said first threaded surface and disposed in surrounding relationship with the male flange, said second spacer means applying a generally uniform axial force to the perimeter of the male flange; said first threaded surface and said second threaded surface cooperating to relatively axially displace the port column away from the male flange by said first spacer means applying said axial force to the port column and said second spacer means applying said axial force to the male flanges when said first spacer means and said second spacer means are relatively rotated.

10. The combination of claim 9 including a generally annular plate means interposed between said first radial flange of said first spacer means and the port column for applying said force from said first radial flange of said first spacer means to the port column.

11. The combination of claim 10 including friction reducing means interposed between said annular plate means and said first radial flange for reducing the amount of friction on said first pacer means when said first spacer means is rotate d relative o the port column.

12. The combination of claim 11 including said first annular inwardly projecting radial flange disposed to position said friction reducing means and said annular plate means within said first spacer means.

13. The combination of claim 12 including retaining means disposed in said first spacer means and in contact with said annular plate means for holding said annular plate means and said friction reducing means in position.

14. The combination of claim 13
wherein said first spacer means defines a generally annular groove, and
wherein said retaining means is snap fitting means disposed within said groove.

15. The combination of claim 9 including said second spacer means having a second generally annular flange in contact with the male flange for applying said force from said second spacer means to the male flange.

16. Apparatus for relatively spacing first and second conduits which incorporate sealing means that resist the passage of fluid through the seam between the first and second conduits when the first and second conduits are relatively axially displaced comprising:
first spacer means having a first threaded surface and disposed in surrounding relationship with the first conduit, said first spacer means having a first generally annular inwardly projecting radial flange for applying a generally uniform axial force to the perimeter of the first conduit; and
second spacer means having a second threaded surface which cooperates with said first threaded surface and disposed in surrounding relationship with the second conduit, said second spacer means having a second generally annular inwardly projecting radial flange for applying a generally uniform axial force to the perimeter of the second conduit;
said first threaded surface and said second threaded surface cooperating to relatively axially displace the first conduit and the second conduit by said first spacer means applying said axial force to the first conduit and said second spacer means applying said axial force to the second conduit when said first spacer means and said second spacer means are relatively rotated.

17. The apparatus of claim 17 including a generally annular plate means interposed between said first radial flange of said first spacer means and the first conduit for applying said force from said radial flange of said first spacer means to the first conduit.

18. The apparatus of claim 18 including friction reducing means interposed between said annular plate means and said first radial flange for reducing the amount of friction on said first spacer means when said first spacer is rotated relative to the first conduit.

19. The apparatus of claim 18 including said first annular inwardly projecting radial flange disposed to position said friction reducing means and said annular plate means within said first spacer means.

20. The apparatus of claim 19 including retaining means disposed in said first spacer means and in contact with said annular plate means for holding said annular plate means and said friction reducing means in position.

21. The apparatus of claim 20
wherein said first space means defines a generally annular groove, and
wherein said retaining means is snap fitting means disposed within said groove.

* * * * *